United States Patent
Ghosh et al.

(10) Patent No.: US 7,499,506 B2
(45) Date of Patent: Mar. 3, 2009

(54) DETECTION OF SIGNAL MODULATION FORMAT TYPE

(75) Inventors: Kaushik Ghosh, San Diego, CA (US); Helena D. O'Shea, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 11/087,328

(22) Filed: Mar. 22, 2005

(65) Prior Publication Data

US 2006/0215789 A1    Sep. 28, 2006

(51) Int. Cl.
H04L 27/22    (2006.01)

(52) U.S. Cl. .................. 375/329; 375/227; 375/324

(58) Field of Classification Search .......... 375/224, 375/229, 230, 231, 237, 238, 239, 316, 322, 375/324, 329, 332, 346, 348, 227; 455/3.01, 455/39, 44, 63.1, 67.11, 73, 67.13; 370/465, 370/522

See application file for complete search history.

(56) References Cited

U.S. PATENT DOCUMENTS

| | | | |
|---|---|---|---|
| 6,400,928 B1 * | 6/2002 | Khullar et al. | 455/67.11 |
| 6,687,507 B2 * | 2/2004 | Fischer et al. | 455/456.6 |
| 2003/0060244 A1 * | 3/2003 | Ruohonen | 455/574 |
| 2003/0165157 A1 * | 9/2003 | Pollmann et al. | 370/465 |
| 2004/0203992 A1 * | 10/2004 | Yun | 455/522 |
| 2006/0198362 A1 * | 9/2006 | Molev-Shteiman et al. | 370/352 |

FOREIGN PATENT DOCUMENTS

| | | |
|---|---|---|
| EP | 1383290 | 1/2004 |
| WO | 0062498 | 10/2000 |
| WO | 0103397 | 1/2001 |
| WO | 0139449 | 5/2001 |

OTHER PUBLICATIONS

Reddy, Sharath, "An Efficient Blind Modulation Detection Algorithm for Adaptive OFDM Systems;" 0-7803-7954 (Mar. 2003) IEEE.

* cited by examiner

*Primary Examiner*—David C Payne
*Assistant Examiner*—Leon Flores
(74) *Attorney, Agent, or Firm*—Timothy Loomis; Stanton Braden; Thomas R. Rouse

(57) ABSTRACT

A biasing algorithm, apparatus and method for detecting and modulation format of a received signal used in a mobile phone system implementing EDGE technology that transmits and receives both GMSK and 8PSK modulated signals. The biasing method and apparatus may also estimate the modulation format of bursts of data blocks of a received signal using information gathered and/or results determined during the modulation detection of one or more previous bursts of a data block to bias the modulation detection of a present burst of the same data block. The gathered information during the modulation detection of a previous burst includes either the signal-to-noise ratio or the noise energy information of the previous burst.

4 Claims, 14 Drawing Sheets

DETECTION OF SIGNAL MODULATION FORMAT TYPE

BACKGROUND

1. Field

The present invention relates generally to mobile phone technology, and more specifically to detecting the modulation format type of a signal.

2. Background

Currently a popular standard for digital mobile phone technology is Global System for Mobile Communications (GSM) which is a second generation (2G) mobile phone system. An add-on enhancement to the GSM communications system that is gaining widespread acceptance is Enhanced Data Rates for Global Evolution (EDGE). EDGE technology increases data throughput to 384 Kbps and meets the International Telecommunications Union's standards for a third generation (3G) network. Services associated with 3G telephone technology include the ability to transfer both voice data (a telephone call) and non-voice data (e.g., email, instant messaging, etc.).

EDGE technology transmits and receives signals in both Gaussian Minimum Shift Keying (GMSK) and 8 Phase Shift Keying (8PSK) modulation formats. As is well known in the art, GMSK is a digital modulation technology using Phase Shift Keying where an information signal can contain two possible distinct phase shifts. As is well known in the art, 8PSK is also a digital modulation technology using Phase Shift Keying where the information signal contains eight possible distinct phase shifts. GMSK technology produces a one bit word/symbol for every change in phase while 8PSK produces a three bit word/symbol for every change in phase (as compared to the phase of a reference wave).

In a cellular mobile phone system using EDGE technology, EDGE compatible hardware and software are included at base stations (e.g., in tranceiver units) and mobile terminals (e.g., cellular phones) to modulate and demodulate signals using the EDGE shift keying schemes. Signals are typically modulated and transmitted as data blocks (the basic unit for transmitting data) where a data block is comprised of four bursts of data. All four bursts of a data block are typically modulated in the same format type (either GMSK or 8PSK) so that each data block of a signal has one uniform modulation format type.

Since EDGE compatible base stations transmit both GMSK and 8PSK signals, a mobile terminal must be able to detect the modulation format (GMSK or 8PSK) of a received signal in order to demodulate the signal correctly. Conventionally, modulation format type detection is performed by independently examining each burst of a data block of the received signal and determining the modulation type for that burst. After the modulation type is determined for a burst, the burst is treated as a burst of the determined modulation format and processed (i.e., demodulated) as such. The next determination is then made independently on the next burst of the data block and processed accordingly. As such, conventionally the modulation type of a burst is determined independently/separately from the other bursts of the same data block and then processed independently based on the determination.

Conventional methods of determining the modulation format type of bursts of a received signal, however, cause a significant amount of misdetections (i.e., incorrect determinations of the modulation format type) especially at low signal strength levels (i.e., in cases where the received signal has a low signal-to-noise ratio). As such, there is a need for a more accurate method for detecting the modulation format type of a received signal, especially at low signal strength levels when the probability of misdetection is much higher.

SUMMARY

Embodiments disclosed herein address the above stated needs by providing a more accurate biasing algorithm and apparatus for detecting the modulation format type of a received signal. In some aspects, the biasing algorithm and apparatus are used in a mobile phone system implementing EDGE technology that transmits and receives both GMSK and 8PSK modulated signals. In some aspects, the biasing algorithm and apparatus detect/estimate the modulation format (GMSK or an 8PSK) of bursts of data blocks of a received signal by using information gathered and/or results determined during the modulation detection of one or more previous bursts of a data block to influence/bias the modulation detection of a present burst of the same data block. In some aspects, the gathered information during the modulation detection of a previous burst comprises either the signal-to-noise ratio (SNR) or the noise energy information of the previous burst.

As such, modulation detection information and/or results regarding a burst of a data block is used to bias and improve the modulation detection accuracy of one or more subsequent bursts of the same data block. In some aspects, the biasing algorithm and apparatus do not determine the modulation format type of some bursts of a data block in an independent manner (i.e., the modulation format of some bursts of a data block are not determined without considering detections of other bursts in the same data block, but rather, are biased by the detection of one or more of the other bursts).

In some aspects, the biasing algorithm is implemented through software and/or hardware configured to implement the algorithm. In some aspects, the configured software and/or hardware are installed on a mobile terminal (e.g., cellular phone) that is capable of receiving modulated radio signals in at least two different modulation format types (e.g., GMSK and 8PSK).

Test results show that there is an improvement in modulation detection accuracy (especially at low signal levels) of the biasing detection algorithm over the conventional detection method.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail. The word "exemplary" is used herein to mean "serving as an example, instance, or illustration." Any embodiment described herein as "exemplary" is not necessarily to be construed as preferred or advantageous over other embodiments.

The below description is divided into four sections. Section I discusses basic terms and concepts regarding mobile communications. Section II discusses statistics and test results of conventional methods of modulation detection and conclusions that can be drawn from these statistics and test results. Section III discusses an improved biasing method that more accurately detects the modulation type of bursts of a received signal. Section IV discusses improved test results of the biasing method in detecting the modulation type of bursts of a received signal.

Section I: Terms and Concepts

Figure 1:
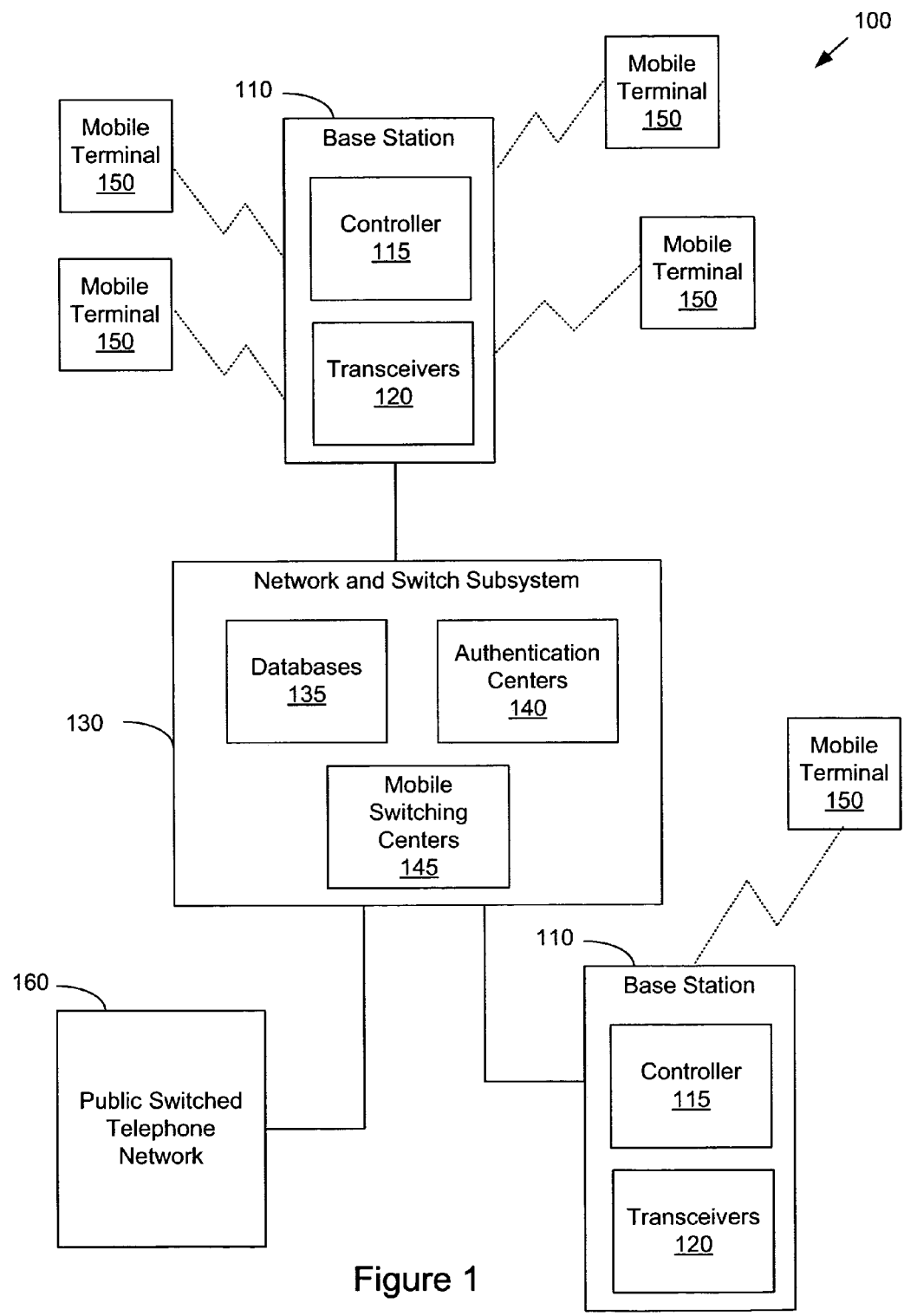
FIG. 1 is a diagram of a mobile communications system.

FIG. 1 is a diagram of a mobile communications system 100. The mobile communications system 100 comprises one or more base station subsystems 110, a network and switch subsystem 130, one or more mobile terminals 150, and a public switched telephone network 160. A base station subsystem 110 is coupled with the network and switch subsystem 130 and the public switched telephone network 160 and communicates with the mobile terminals 150 through a form of wireless transmission (radio transmission) via the airwaves.

Each base station subsystem 110 is typically comprised of a base station controller 115 and one or more base transceiver stations 120. A base transceiver station 120 is used to transmit and receive radio signals to and from mobile terminals 150 and includes equipment to do so (e.g., radio tower, etc.). The base station controller 115 is used to pass on signal connections to mobile switching centers 145 of the network and switch subsystem 130.

The network and switch subsystem 130 is typically comprised of a plurality of home and visitor databases 135, a plurality of authentication centers 140, and a plurality of mobile switching centers 145. The home and visitor location databases 135 are used to store records of subscriber information, location information for the mobile terminals 150, and other information. The authentication center 140 is used in conjunction with the home and visitor location databases 135 to provide authentication for security purposes. The mobile switching centers 145 are used to switch signal connections for the public switched telephone network 160 and the base station controllers 115.

Subscribers of a subscribed network are able to communicate with other subscribers or with non-subscribers outside the network (such as users within the public switched telephone network 160) through use of a mobile terminal 150 that comprises a receiving device (e.g., cellular phone, personal digital assistant (PDA), laptop computer, Blackberry™, personal digital assistant (PDA), or any other portable computer, etc.).

In some embodiments, the mobile communications system 100 utilizes EDGE technology to transmit and receive both GMSK and 8PSK modulated signals. In these embodiments, the hardware or software implemented in the various components (e.g., the base station controllers 115, base transceiver stations 120, mobile terminals 150, etc.) of the mobile communications system 100 are configured to transmit and receive both GMSK and 8PSK signals.

Figure 2:
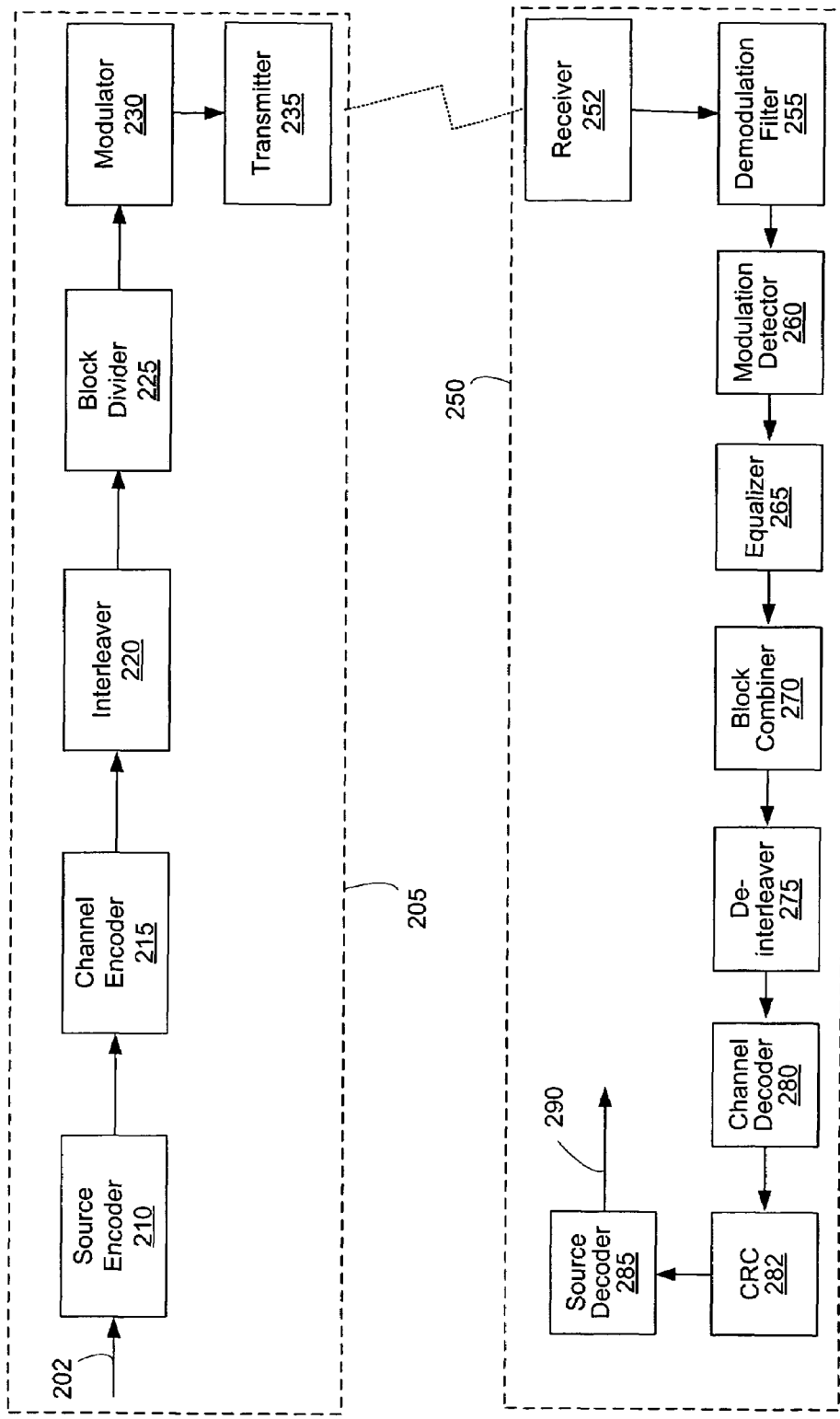
FIG. 2 is a diagram conceptually illustrating various components used in a mobile communications system.

FIG. 2 is a diagram conceptually illustrating various components used in a mobile communications system for modulating/encoding and demodulating/decoding signals. The functions of the various components described below are implemented through hardware and/or software configured to modulate/encode and demodulate/decode using GMSK and 8PSK modulation formats.

The various components of FIG. 2 includes transmitting components 205 used to modulate/encode and transmit signals and receiving components 250 used to receive and demodulate/decode signals. In some embodiments, the transmitting components 205 are components of a transceiver at a base station. In some embodiments, the receiving components 250 are components of a mobile terminal (e.g., cellular phone). The various components of a mobile communications system are well known in the art and thus are not discussed in extended detail here.

The transmitting components 205 comprise a source encoder 210, a channel encoder 215, an interleaver 220, a block divider 225, a modulator 230, and a transmitter 235. The source encoder 210 receives an information bitstream 202 representing original information that is to be transmitted. Examples of such original information include voice, music or other audio stream, video stream, email data, video or audio streaming or other real time data, file download operations (e.g., under file transfer protocol (FTP)), etc. The above list is not exhaustive, however, and other types of original information can be represented by the information bitstream 202.

The source encoder 210 compresses the information bitstream while the channel encoder 215 (e.g., convolutional encoder) is used to introduce redundant bits to the bitstream to provide for error detection and correction at the receiving end. The interleaver 220 interleaves the bits of the information bitstream by interchanging positions of the bits to mitigate effects of deep fade (in a fading environment). Note that the modulation coding scheme (MCS) that supports the 8PSK modulation format uses a different channel encoder 215 and interleaver 220 than the modulation coding scheme that supports the GMSK modulation format.

The information bitstream comprises a plurality of data blocks, a data block being a basic processing unit of the information bitstream. The block divider 225 divides each data block of the information bitstream into four bursts of data while the modulator 230 modulates/encodes the information bitstream by modulating/encoding each burst of the information bitstream as a GMSK or 8PSK formatted burst. In general, a modulation format has a particular number of possible symbols that are used to represent/encode bits. A symbol is a possible state (e.g., phase shift) permitted under the particular modulation format. Under the GMSK format, only two possible symbols/states are used to represent data where each state represents a single bit. Whereas under the 8PSK format, eight possible symbols/states are used to represent data whereby each state represents three bits of data. As such, under the GMSK format, a symbol represents one bit of the information bitstream and under the 8PSK format, a symbol represents three bits of the information bitstream. In addition to information symbols (representing the original information to be transmitted), a GMSK or 8PSK formatted burst also includes training sequence (TSC) symbols used to detect the modulation format of the burst (as discussed below in relation to FIG. 3).

In addition to modulating the information bitstream, the modulator 230 also imposes it on a carrier signal to produce a modulated signal for transmission. The modulator 230 also does additional processing steps, such as Gaussian filtering to remove intersymbol interference (ISI) components, etc. The modulated signal is then transmitted on a channel by a transmitter 235 using a particular transmission technology (e.g., Time Division Multiple Access).

The receiving components 250 comprise a receiver 252, a demodulation filter 255, a modulation detector 260, an equalizer 265, a block combiner 270, a de-interleaver 275, a channel decoder 280, a cyclic redundancy checker (CRC) 282, and a source decoder 285. The receiver 252 receives the modulated signal while the demodulation filter 255 removes the carrier signal to produce a "soft decision" signal/output at the baseband frequency. As known in the art, a "soft decision" signal/output is not a bitstream having only 0 or 1 values but contains intermediate values, such as 1.3, 2.5, etc.

The modulation detector 260 estimates the modulation format of the bursts of the signal (as GMSK or 8PSK bursts) received from the demodulation filter 255. In some embodiments, the modulation detector 260 is implemented through hardware and/or software configured to perform an improved biasing detection method. After estimation of a burst as a GMSK or 8PSK burst, the burst is then treated as such by the remaining receiving components 250.

The equalizer 265 then removes intersymbol interference (ISI) from the bursts received from the modulation detector 260 and the block combiner 270 combines the bursts back into data blocks (four bursts per block). The de-interleaver 275 then performs the reverse operation of the interleaver 220 and rearranges bits back to their original positions. The channel decoder 280 (e.g., Viterbi decoder) then uses the redundant bits introduced by the channel encoder 215 to perform error detection and correction. The CRC 282 determines whether the error correction of the channel decoder 280 on a burst is sufficient so that the bits of a burst have been correctly received. If a burst passes the CRC 282 determination, it is passed to the source decoder 285, otherwise it is discarded. The source decoder 285 then decompresses the signal received from the channel decoder 280 to retrieve an information signal 290 (in "soft decision" form) representing the original information designated to be transmitted (e.g., audio or video stream, email data, etc.).

After estimation of a burst as a GMSK or 8PSK burst by the modulation detector 260, the burst is then treated as such by the remaining receiving components 250 that process the burst differently depending on the estimation. For example, the equalizer 265, de-interleaver 275, and channel decoder 280 will comprise different devices or will process the burst differently depending on the estimation of the burst as a GMSK or 8PSK burst. As discussed above, the modulation coding scheme (MCS) that supports the 8PSK modulation format uses a different channel encoder 215 and interleaver 220 than the modulation coding scheme that supports the GMSK modulation format. As such, the de-interleaver 275 and the channel decoder 280 will comprise different devices based on the modulation estimation of the burst. If a burst is not detected correctly and processed under the incorrect modulation format, it is unlikely that the burst will receive a pass determination from the CRC 282 and will likely be discarded.

Figure 3:
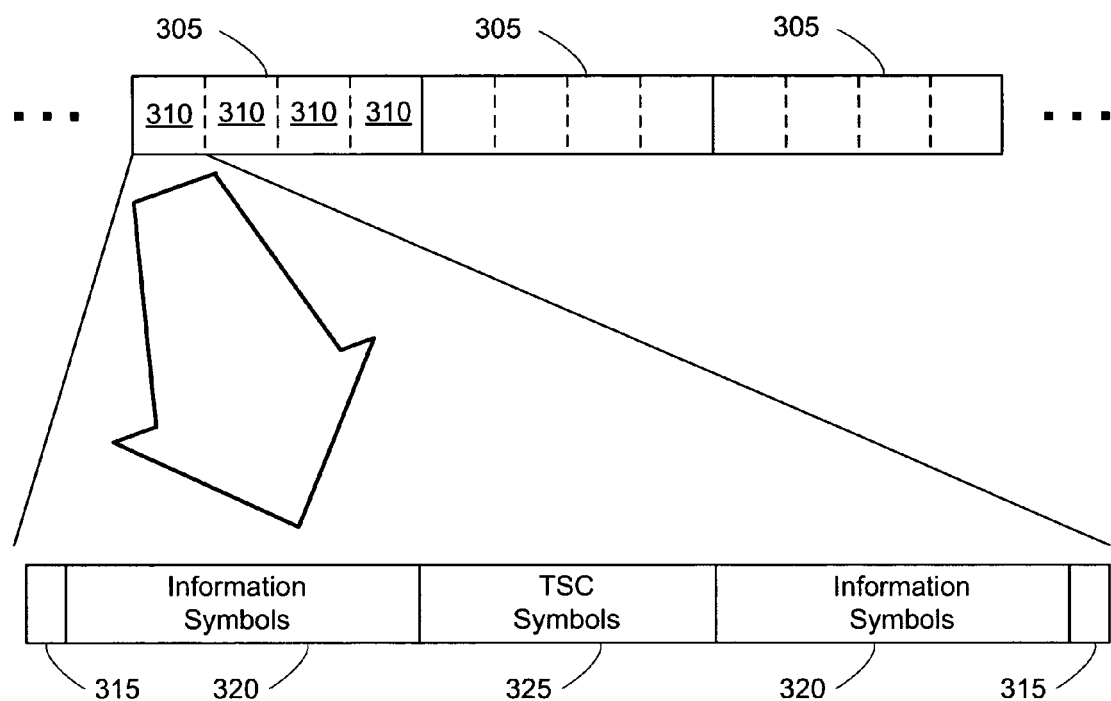
FIG. 3 shows a conceptual illustration of a signal comprising data blocks, each block comprising four bursts of data.

As discussed above, signals are typically modulated and transmitted in data blocks (the basic unit for transmitting data) where a data block is comprised of four bursts of data. FIG. 3 shows a conceptual illustration of a signal comprising data blocks 305, each block 305 comprising four bursts of data 310. Conceptually, a burst 310 has a structure containing particular types of symbols in a particular order. The structure of a burst 310 typically contains a first set of guard symbols 315 at a first end of the structure, then a first set of information symbols 320, training sequence (TSC) symbols 325 in the center of the structure, then a second set of information symbols 320, and a second set of guard symbols 315 at a second end of the structure. The first and second sets of information symbols represent the original information designated to be transmitted (e.g., audio or video stream, email data, etc.).

TSC symbols 325 typically comprise symbols used to estimate the channel, frequency error, timing, and modulation format type. In some embodiments, the TSC symbols of a burst are used to determine the modulation format type of the burst. In these embodiments, the TSC symbols of a burst are used to determine the signal-to-noise ratio (SNR) estimates of the burst treated as an 8PSK burst and treated as a GMSK burst. The modulation format type of the burst is then estimated based on a comparison of the SNR estimates of the burst as an 8PSK and GMSK burst. In other embodiments, the noise energy estimates, rather than the SNR estimates, of the burst are used to detect the modulation format type of the burst. These embodiments are discussed below in relation to FIGS. 8 and 9.

Section II: Test Results for Conventional Detection Methods

Figure 4:
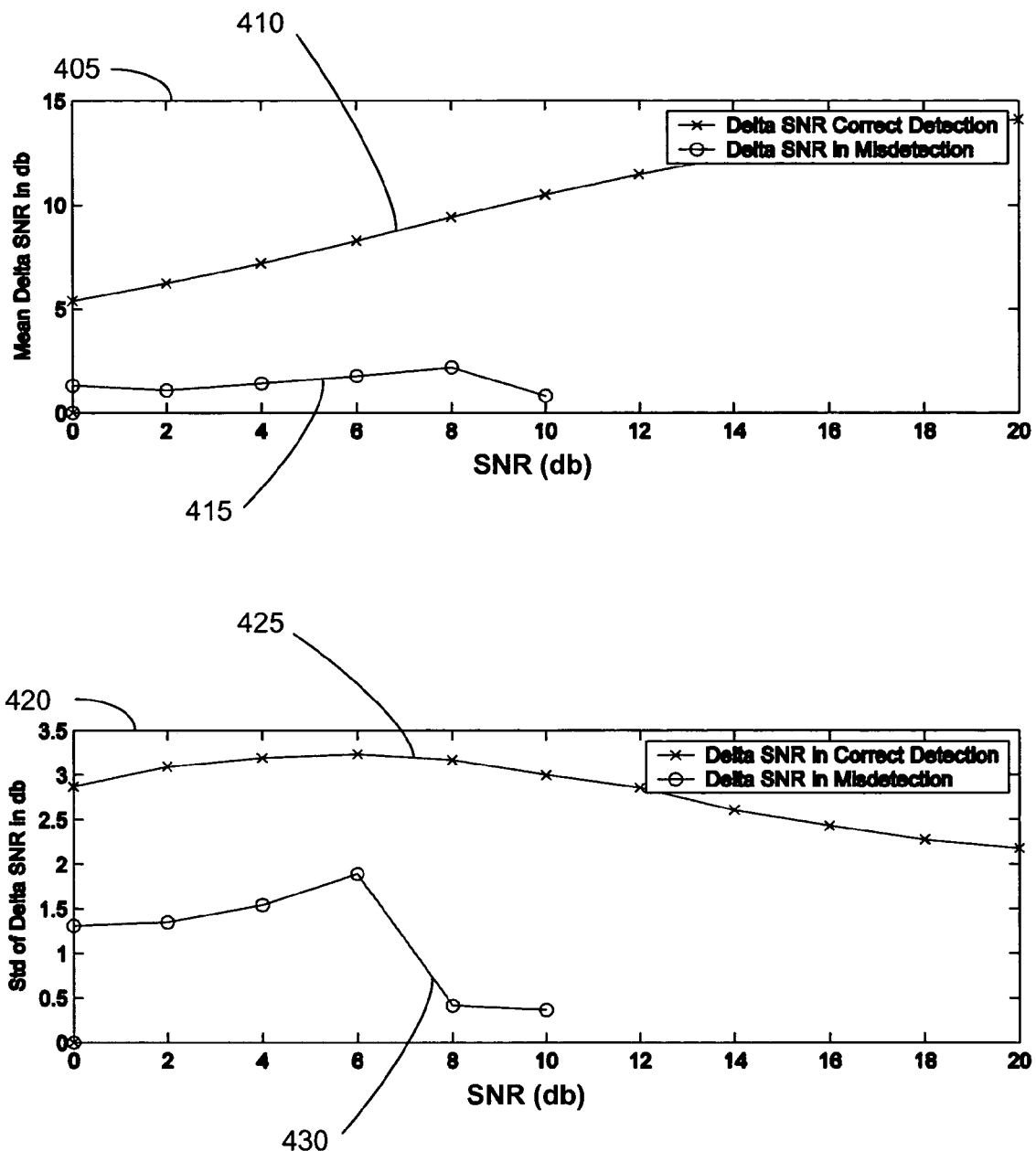
FIG. 4 shows graphs illustrating SNR statistical results of detection and misdetection cases of a conventional method in detecting a GMSK modulated signal.

FIG. 4 shows graphs illustrating statistical test results of a conventional modulation detection method in detecting a GMSK modulated signal under Typical Urban with 50 kilometers per hour (TU50) channel conditions.

As discussed above, the conventional modulation detection determines the modulation type of a burst separately and independently from other bursts of the same data block by comparing the SNR estimates of the burst treated as an 8PSK and a GMSK burst. The SNR estimate of the burst treated as an 8PSK is sometimes referred to herein as "SNR_8PSK" and the SNR estimate of the burst treated as a GMSK is sometimes referred to herein as "SNR_GMSK." The absolute value of the difference between these SNR estimates is sometimes referred to herein as "delta SNR" and can be expressed by the following equation: delta SNR=abs(SNR_8PSK−SNR_GMSK).

The top graph 405 contains a first segmented line 410 that illustrates the mean delta SNR value (in decibels) of correct detection instances as a function of the SNR of the signal. The top graph 405 also contains a second segmented line 415 that illustrates the mean delta SNR value of incorrect detection instances as a function of the SNR of the signal. The bottom graph 420 contains a third segmented line 425 that illustrates the standard deviation of delta SNR of correct detection instances as a function of the SNR of the signal. The bottom graph 420 also contains a fourth segmented line 430 that illustrates the standard deviation delta SNR of misdetection instances as a function of the SNR of the signal.

The graphs 405 and 420 show that, when using the conventional modulation detection method, the value of delta SNR during misdetection cases is typically much lower as compared to the value of delta SNR during correctly detected cases. This is due to the fact that delta SNR is equal to the absolute difference between the SNR values of a burst treated as an 8PSK burst and a GMSK burst. When the absolute difference between these SNR values is low, this indicates that the burst is not clearly an 8PSK burst or a GMSK burst. As such, this indicates a low confidence in modulation detections at relatively low delta SNR values and a higher probability of misdetection at low signal strength levels (where the value of delta SNR is low).

Figure 5:
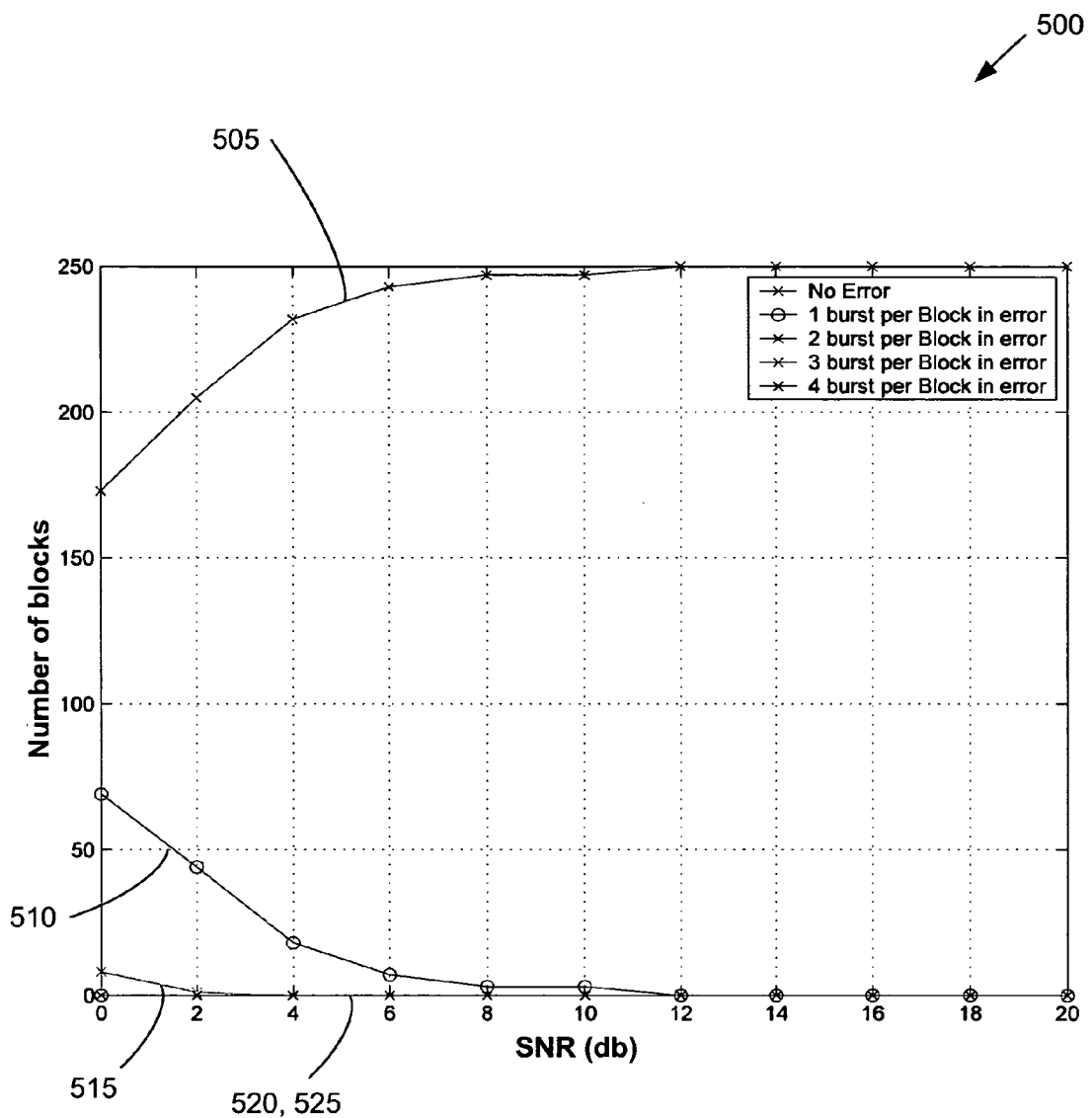
FIG. 5 shows graphs illustrating SNR statistical results of misdetections per data block of a conventional method in detecting a GMSK modulated signal.

FIG. 5 shows a graph 500 illustrating further statistical test results of a conventional modulation detection method in detecting a GMSK modulated signal under TU50 channel conditions. The graph 500 contains a first segmented line 505 that illustrates the number of data blocks having no misdetections of bursts in the block as a function of the SNR of the GMSK signal. The graph 500 also contains a second segmented line 510 that illustrates the number of data blocks having one misdetection of a burst in the block as a function of the SNR of the GMSK signal. Third, fourth, and fifth segmented lines 515, 520, and 525 illustrate the number of data blocks having two, three, and four misdetections of bursts, respectively, in the block as a function of the SNR of the GMSK signal. The graph 500 shows that, when using the conventional modulation detection method, the probability of there being more than one burst per data block having a misdetection is low.

As such, statistical test results of the conventional modulation detection method indicate that there is a higher probability of misdetection at low signal strength levels (where the value of delta SNR is low) and that the probability of there being more than one burst per data block having a misdetection is low.

Section III: Improved Biasing Modulation Detection

In some embodiments, statistical features of misdetection cases of the conventional detection technique (as discussed in Section II) are used to derive an improved biasing modulation detection method. In some embodiments, the biasing method uses information and/or results gathered during the modulation detection of one or more previous bursts of a data block to influence/bias the modulation detection of a present burst of the same data block. In some embodiments, the gathered information during the modulation detection of a previous burst comprises SNR or noise energy information of the previous burst. As such, modulation detection information and/or results regarding a burst of a data block is used to bias and improve the modulation detection accuracy of one or more subsequent bursts of the same data block. In some embodiments, the biasing method does not determine the modulation format of bursts of a data block in an independent manner.

Figure 6A:
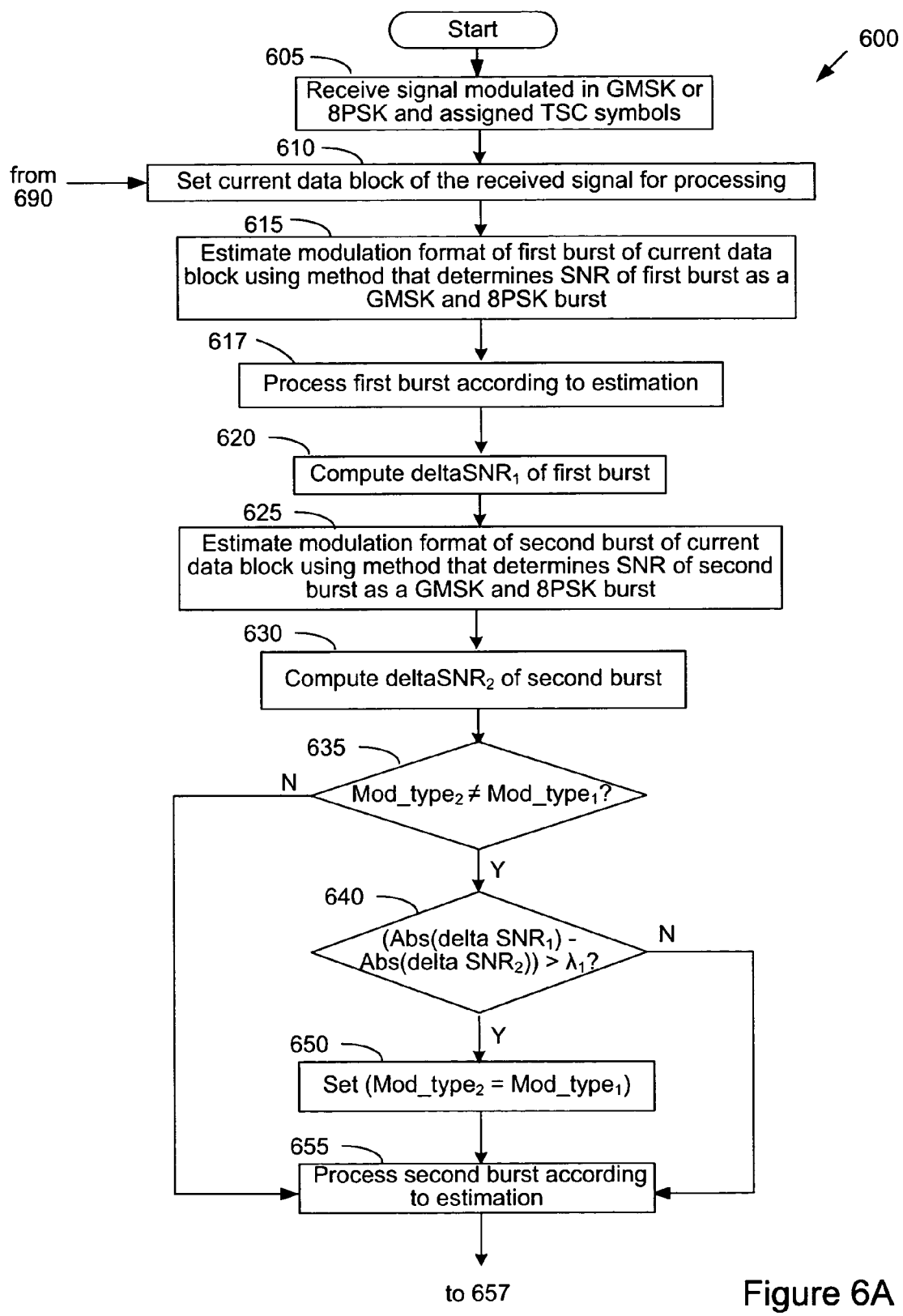
FIGS. 6A-B are flowcharts of an improved biasing method for detecting the modulation format types of bursts of a received signal using SNR values of the bursts.
Figure 6B:
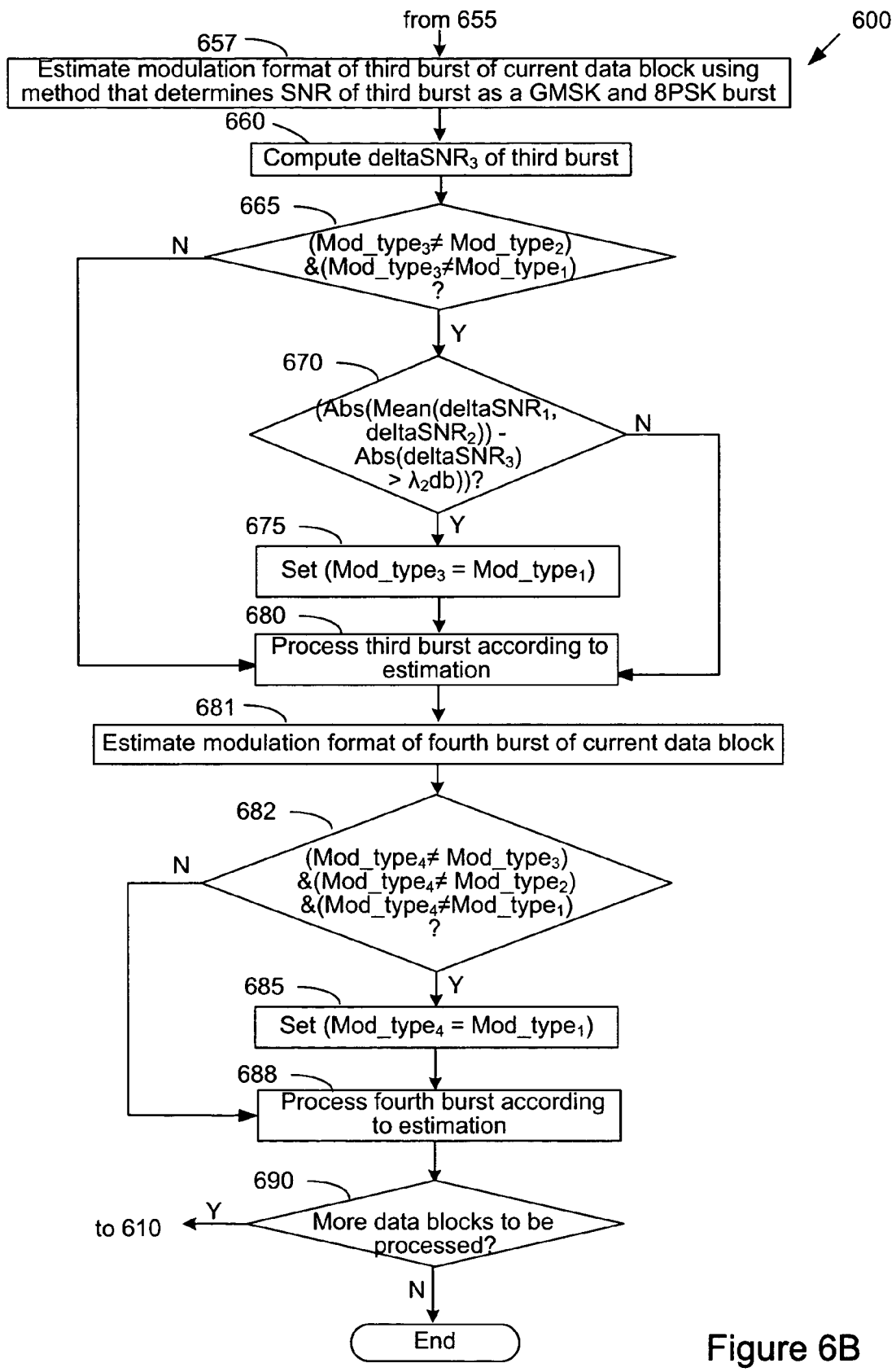

FIGS. 6A-B are flowcharts of an improved biasing method 600 for detecting the modulation format types of bursts of a received signal using SNR values of the bursts. In some embodiments, software and/or hardware is configured to implement the method 600. In some embodiments, the configured software and/or hardware are installed on a receiving device that receives modulated radio signals (such as a mobile terminal) in at least two different modulation format types (e.g., GMSK and 8PSK).

The method 600 begins when it receives (at 605) assigned TSC symbols (from a base station) and a signal that has been modulated in one of two or more different modulation format types. In the embodiments described below, the received signal is modulated either in a first modulation format type being GMSK or in a second modulation format type being 8PSK. In other embodiments, the received signal is modulated in different format types and/or in a different number of format types. The received modulated signal comprises a plurality of data blocks, each data block comprising a plurality of bursts. In the embodiments described below, a data block comprises four bursts of data. In other embodiments, data blocks have a different number of bursts.

The modulated signal and assigned TSC symbols are typically received from a base station that allocates resources required by a plurality of simultaneous modulated signals (phone calls). In allocating resources, the base station assigns each modulated signal one of typically seven possible configurations of TSC symbols. In some embodiments, the assigned TSC symbols are correlated with the TSC symbols of a burst to help determine the modulation format type of the burst (as discussed below in relation to FIG. 8).

The method 600 then sets (at 610) a data block of the received signal as a current data block to be processed. The method then estimates/detects (at 615) the modulation format type of a first burst of the current data block (as either a GMSK or 8PSK burst) using an SNR detection method that determines the SNR estimates of the first burst treated as a GMSK burst and treated as an 8PSK burst. One such SNR detection method is described below in relation to FIG. 8, although in other embodiments, other SNR detection methods are used. The method then processes the first burst (at 617) according to the estimation (i.e., decodes/demodulates the burst as a GMSK or 8PSK burst using appropriate software and/or hardware configured to do such).

The method then computes (at 620) the difference in SNR estimates (referred to as a first delta SNR or $\Delta SNR_1$) of the first burst as a GMSK burst and as an 8PSK burst. The method 600 then makes an estimation/detection (at 625) of the modulation format type of a second burst of the current data block (as either a GMSK or 8PSK burst) using an SNR detection method that determines the SNR estimate of the second burst as a GMSK and an 8PSK burst. The method then computes (at 630) the difference in SNR estimates (referred to as a second delta SNR or $\Delta SNR_2$) of the second burst as a GMSK burst and as an 8PSK burst. The method then biases the estimation of the modulation format type of the second burst using gathered information ($\Delta SNR_1$) and estimation results from the modulation detection of the first burst. In some embodiments, the method biases the estimation of the second burst by also using a first predetermined confidence metric (in decibels).

To bias the estimation of the second burst, the method 600 determines (at 635) if the estimation of the modulation format of the second burst is different than estimation for the first burst. If not, the method continues at step 655. However, if the modulation format estimates are different, the method then determines (at 640) if the difference between the first and second delta SNRs of the first and second bursts, respectively, is greater than the first predetermined confidence metric. If so, the method resets (at 650) the estimation of the modulation format of the second burst to equal the estimation of the modulation format of the first burst (determined at step 615). If not, the method continues at step 655 where the method processes the second burst according to the estimation.

In some embodiments, steps 635 through 650 of the method 600 are expressed by the following algorithm:

if ((Mod_type$_2 \neq$Mod_type$_1$) & (abs($\Delta$SNR$_1$)−abs($\Delta$SNR$_2$)>$\lambda_1$db))

then (Mod_type$_2$=Mod_type$_1$)

where Mod_type$_1$=the modulation format estimation for the first burst;
Mod_type$_2$=the modulation format estimation for the second burst;
$\Delta$SNR$_1$=the first delta SNR for the first burst;
$\Delta$SNR$_2$=the first delta SNR for the second burst; and
$\lambda_1$db =the first predetermined confidence metric.

The method then continues to bias estimations for each subsequent burst of the data block. At step 657, the method makes an estimation of the modulation format of a third burst of the current data block (as either a GMSK or 8PSK burst) using an SNR detection method that determines the SNR estimate of the third burst as a GMSK and an 8PSK burst. The method then computes (at 660) the difference in SNR estimates (referred to as a third delta SNR or $\Delta$SNR$_3$) of the third burst as a GMSK and 8PSK burst. The method then biases the estimation of the modulation format of the third burst using the gathered information ($\Delta$SNR$_1$ and $\Delta$SNR$_2$) and estimation results from the modulation detection of the first and second bursts. In some embodiments, the method also biases the estimation of the third burst using a second predetermined confidence metric (in decibels).

To bias the estimation of the third burst, the method 600 determines (at 665) if the estimation of the third burst is different than the estimation for the first burst and also different than the estimation for the second burst. If not, the method continues at step 680. However, if this condition is true, the method then determines (at 670) whether the difference between the mean of ($\Delta$SNR$_1$ and $\Delta$SNR$_2$) and $\Delta$SNR$_3$ is greater than the second predetermined confidence metric. If so, the method resets (at 675) the estimation of the third burst to equal the estimation of the modulation format of the first burst (determined at step 615). If not, the method continues at step 680 where the method processes the third burst according to the estimation.

In some embodiments, steps 665 through 675 of the method 600 are expressed by the following algorithm:

if ((Mod_type$_3 \neq$Mod_type$_2$) &
(Mod_type$_3 \neq$Mod_type$_1$) & (abs(Mean($\Delta$SNR$_1$, $\Delta$SNR$_2$))−abs($\Delta$SNR$_3$)>$\lambda_2$db))

then (Mod_type$_3$=Mod type$_1$)

where Mod_type$_3$=the modulation format estimation for the third burst;
$\Delta$SNR$_3$=the first delta SNR for the third burst; and
$\lambda_2$db=the second predetermined confidence metric.

At step 681, the method makes an estimation of the modulation format of a fourth burst of the current data block (as either a GMSK or 8PSK burst) using an SNR detection method or other detection methods known in the art not based on SNR. The method then biases the estimation of the modulation format of the fourth burst using the estimation results of the first, second, and third bursts. In some embodiments, if all estimations of the first, second, and third bursts are the same (i.e., are all estimates of the same modulation format), the estimation of the fourth burst is reset to equal the same estimation as for the other bursts (so that all four bursts have the same modulation estimation).

To bias the estimation of the fourth burst, the method 600 determines (at 682) if the estimation of the fourth burst is different than the estimations for the first, second, and third bursts. If so, the method resets (at 685) the estimation of the fourth burst to equal the estimation of the modulation format of the first burst (determined at step 615). If not, the method continues at step 688 where the method processes the fourth burst according to the estimation.

In some embodiments, steps 682 through 685 of the method 600 are expressed by the following algorithm:

if ((Mod_type$_4 \neq$Mod_type$_3$) &
(Mod_type$_4 \neq$Mod_type$_2$) &
(Mod_type$_4 \neq$Mod_type$_1$))

then (Mod_type$_4$=Mod_type$_1$)

where Mod_type$_4$=the modulation format estimation for the fourth burst.

At step 690, the method determines if there are more data blocks in the received signal to be processed. If so, the method continues at step 610 where a next data block in the received signal is set as a current data block to be processed. If not, the method ends.

In some embodiments, the predetermined confidence metrics ($\lambda_1$ and $\lambda_2$) are determined through experimentation to find the confidence metric values that produce the best detection accuracy for the method 600. In some embodiments, the predetermined confidence metrics ($\lambda_1$ and $\lambda_2$) are equal in value. In other embodiments, the predetermined confidence metrics ($\lambda_1$ and $\lambda_2$) are not equal in value. In some embodiments, the predetermined confidence metrics ($\lambda_1$ and $\lambda_2$) range in value from 0 through 4 db.

As stated above, a modulation detection of a burst having a low delta SNR indicates a low confidence in the detection since this indicates that the burst is not clearly an 8PSK burst or a GMSK burst. As such, if the delta SNR of the previous burst is significantly greater than the delta SNR of a present burst, this indicates that the confidence of the detection of the previous burst is significantly greater than the confidence of the detection of the present burst so that the method 600 biases the detection of the present burst to equal the detection of the previous burst (if the two detections are not already equal). Conceptually, the value of the predetermined confidence metrics determine what is meant by "significantly greater" and sets the threshold level when the biasing of the method 600 comes into effect. The lower the values of the predetermined confidence metrics, the stronger the biasing effect of the detection method 600.

Also note that the method 600 determines if the estimation for a subsequent burst is different than the estimations for one or more previous bursts and then may bias the estimation of the subsequent burst if this is so. This reflects the statistical observation (discussed above) that the probability of there being more than one misdetection in a data block is low. As such, the method 600 utilizes both statistical observations of the conventional detection method to provide a more accurate modulation detection method, as discussed below in Section IV.

Figure 7A:
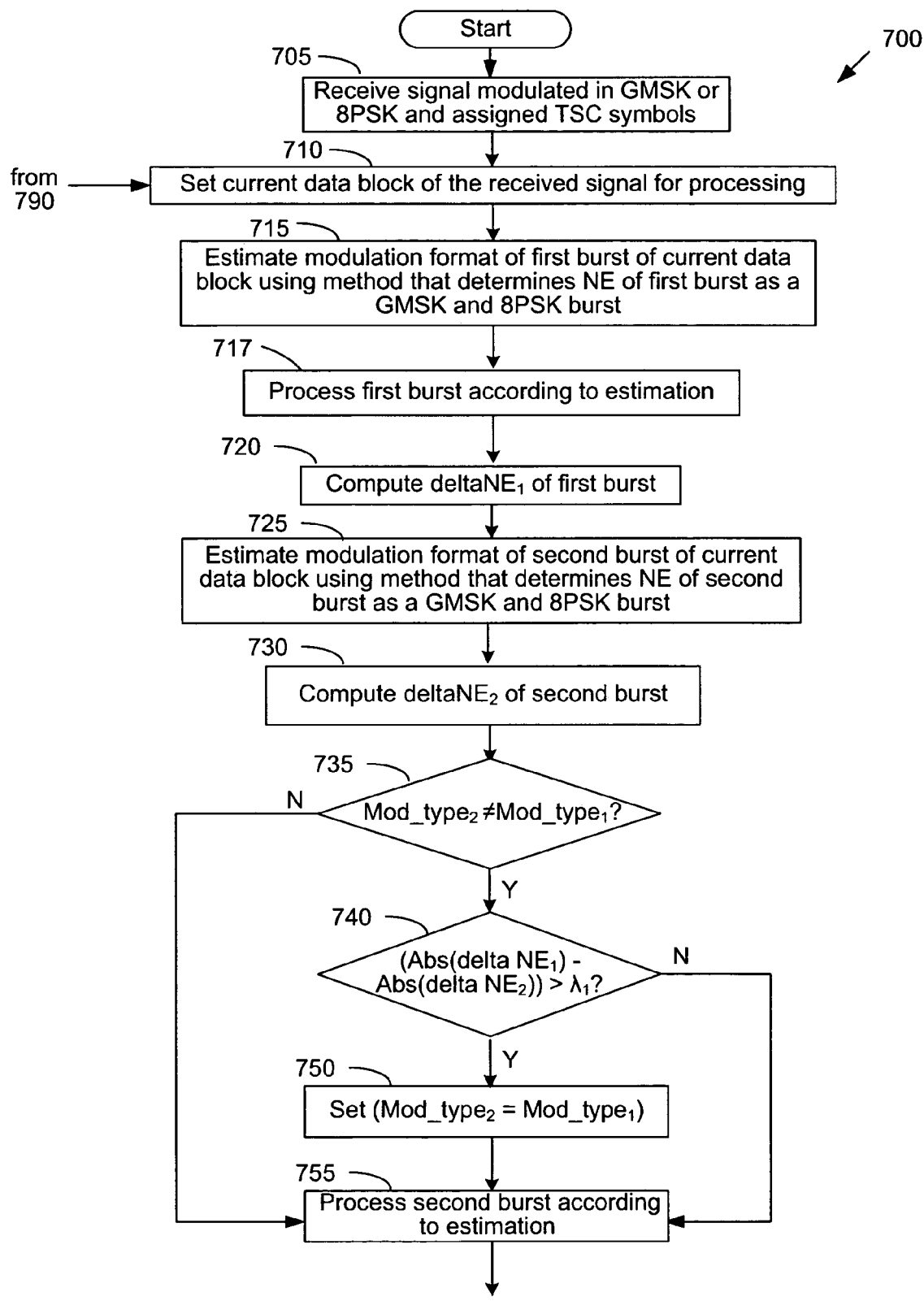
FIGS. 7A-B are flowcharts of an improved biasing method for detecting the modulation format types of bursts of a received signal using noise energy values of the bursts.
Figure 7B:
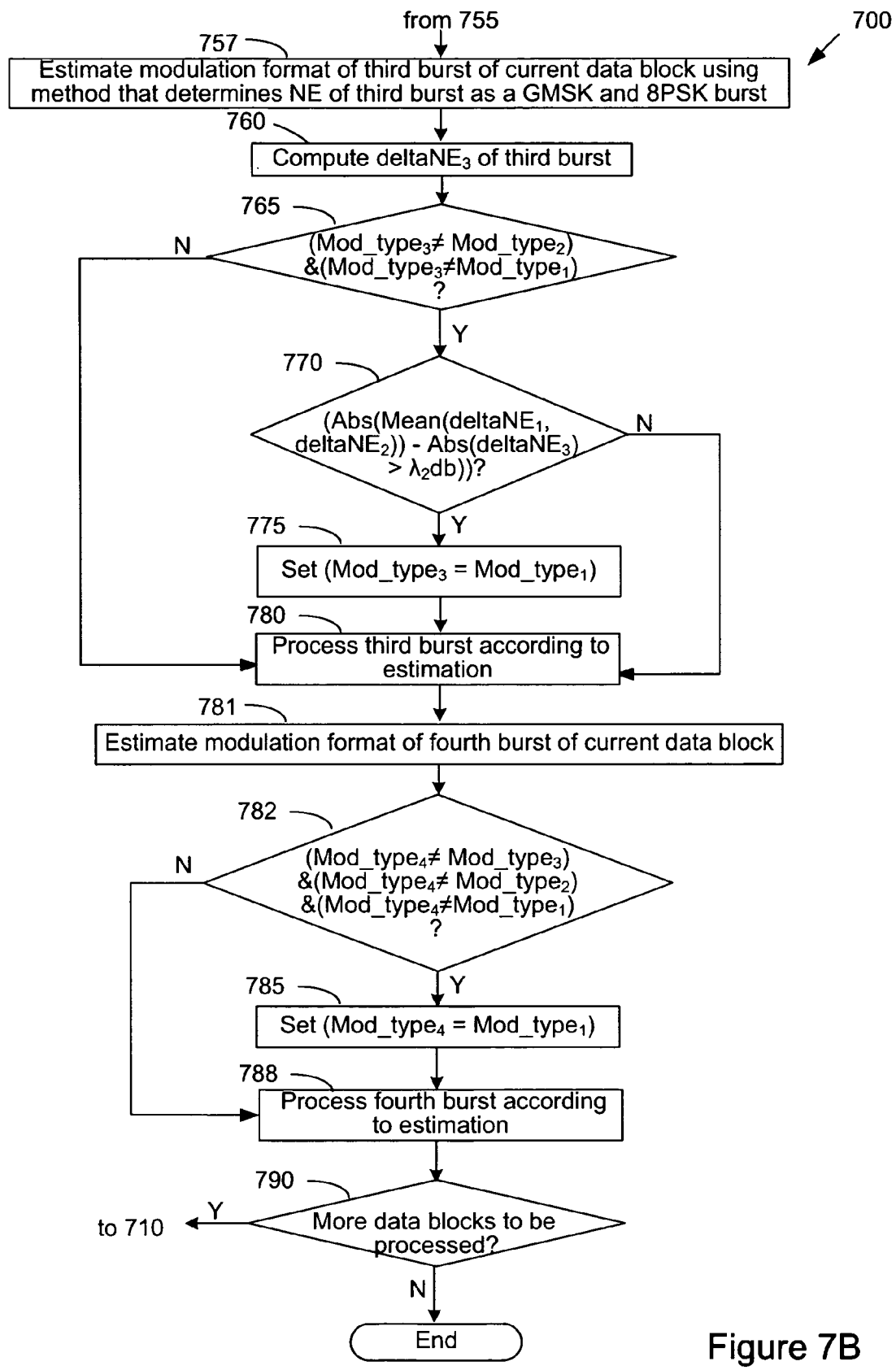

FIGS. 7A-B are flowcharts of an improved biasing method 700 for detecting the modulation format types of bursts of a received signal using noise energy values of the bursts. In some embodiments, software and/or hardware is configured to implement the method 700. In some embodiments, the configured software and/or hardware are installed on a receiving device that receives modulated radio signals (such as a mobile terminal) in at least two different modulation format types (e.g., GMSK and 8PSK).

The noise energy biasing method 700 comprises steps that are similar to steps of the SNR biasing method 600 of FIG. 6 and are not discussed in detail here. The method 700, however, uses noise energy values for detection purposes instead of the SNR values and thus modifies particular steps of the method 600 to reflect the inverse relationship between the SNR level of a burst and the noise energy level of the burst (SNR=channel energy/noise energy). The noise energy (NE) estimate of a burst treated as an 8PSK is sometimes referred to herein as "NE_8PSK" and the NE estimate of the burst treated as a GMSK is sometimes referred to herein as "NE_GMSK." The absolute value of the difference between these SNR estimates is sometimes referred to herein as "delta NE" and can be expressed by the following equation: delta NE=abs(NE_8PSK−NE_GMSK).

The method 700 begins when it receives (at 705) assigned TSC symbols (from a base station) and a signal that has been modulated in one of two or more different modulation format types. In some embodiments, the assigned TSC symbols are correlated with the TSC symbols of a burst to help determine the modulation format type of the burst (as discussed below in relation to FIG. 9).

The method 700 then sets (at 710) a data block of the received signal as a current data block to be processed. The method then estimates/detects (at 715) the modulation format type of a first burst of the current data block (as either a GMSK or 8PSK burst) using a noise energy detection method that determines the noise energy estimates of the first burst treated as a GMSK burst and treated as an 8PSK burst. One such noise energy detection method is described below in relation to FIG. 9, although in other embodiments, other noise energy detection methods are used. The method then processes the first burst (at 717) according to the estimation.

The method then computes (at 720) the difference in noise energy estimates (referred to as a first delta NE or $\Delta NE_1$) of the first burst as a GMSK burst and as an 8PSK burst. The method 700 then makes an initial estimation/detection (at 725) of the modulation format type of a second burst of the current data block using a noise energy detection method that determines the noise energy estimate of the second burst as a GMSK and an 8PSK burst. The method then computes (at 730) the difference in noise energy estimates (referred to as a second delta NE or $\Delta NE_2$) of the second burst as a GMSK burst and as an 8PSK burst. The method then biases the estimation of the modulation format type of the second burst using gathered information ($\Delta NE_1$) and estimation results from the modulation detection of the first burst. In some embodiments, the method biases the estimation of the second burst by also using a first predetermined confidence metric (in watts).

To bias the estimation of the second burst, the method 700 first determines (at 735) if the estimation of the modulation format of the second burst is different than estimation for the first burst. If not, the method continues at step 755. However, if the modulation format estimates are different, the method then determines (at 740) if the difference between the first and second delta NEs of the first and second bursts, respectively, is greater than the first predetermined confidence metric (since low delta NE values imply poor confidence in modulation detection, as discussed below). If so, the method resets (at 750) the estimation of the modulation format of the second burst to equal the estimation of the modulation format of the first burst (determined at step 715). If not, the method continues at step 755 where the method processes the second burst according to the estimation.

In some embodiments, steps 735 through 750 of the method 700 are expressed by the following algorithm:

if ((Mod_type$_2 \neq$Mod_type$_1$) & (abs($\Delta NE_1$)−abs($\Delta NE_2$)>$\lambda_1$))

then (Mod_type$_2$=Mod_type$_1$)

where Mod_type$_1$=the modulation format estimation for the first burst;
Mod_type$_2$=the modulation format estimation for the second burst;
$\Delta NE_1$=the first delta NE for the first burst;
$\Delta NE_2$=the first delta NE for the second burst; and
$\lambda_1$ watt=the first predetermined confidence metric.

At step 757, the method makes an initial estimation of the modulation format of a third burst of the current data block (as either a GMSK or 8PSK burst) using a noise energy detection method that determines the noise energy estimate of the third burst as a GMSK and an 8PSK burst. The method then computes (at 760) the difference in noise energy estimates (referred to as a third delta NE or $\Delta NE_3$) of the third burst as a GMSK and 8PSK burst. The method then biases the estimation of the modulation format of the third burst using the gathered information ($\Delta NE_1$ and $\Delta NE_2$) and estimation results from the modulation detection of the first and second bursts. In some embodiments, the method also biases the estimation of the third burst using a second predetermined confidence metric.

To bias the estimation of the third burst, the method 700 first determines (at 765) if the estimation of the third burst is different than the estimation for the first burst and also different than the estimation for the second burst. If not, the method continues at step 780. However, if this condition is true, the method then determines (at 770) whether the difference between the mean of ($\Delta NE_1$ and $\Delta NE_2$) and $\Delta NE_3$ is greater than the second predetermined confidence metric. If so, the method resets (at 775) the estimation of the third burst to equal the estimation of the modulation format of the first burst (determined at step 715). If not, the method continues at step 780 where the method processes the third burst according to the estimation.

In some embodiments, steps 765 through 775 of the method 700 are expressed by the following algorithm:

if ((Mod_type$_3 \neq$Mod_type$_2$) &
(Mod_type$_3 \neq$Mod_type$_1$) & (abs(Mean($\Delta NE_1$, $\Delta NE_2$))−abs($\Delta NE_3$)>$\lambda_2$)

then (Mod_type$_3$=Mod_type$_1$)

where Mod_type$_3$=the modulation format estimation for the third burst;
$\Delta NE_3$=the first delta NE for the third burst; and
$\lambda_2$ watt=the second predetermined confidence metric.

At step 781, the method makes an initial estimation of the modulation format of a fourth burst of the current data block using a noise energy detection method or other detection methods known in the art not based on noise energy. The method then biases the estimation of the modulation format of the fourth burst using the estimation results of the first, second, and third bursts. In some embodiments, if all estimations of the first, second, and third bursts are the same (i.e., are all estimates of the same modulation format), the estimation of the fourth burst is reset to equal the same estimation as for the other bursts (so that all four bursts have the same modulation estimation).

To bias the estimation of the fourth burst, the method 700 determines (at 782) if the estimation of the fourth burst is different than the estimations for the first, second, and third bursts. If so, the method resets (at 785) the estimation of the fourth burst to equal the estimation of the modulation format of the first burst (determined at step 715). If not, the method continues at step 788 where the method processes the fourth burst according to the estimation.

In some embodiments, steps 782 through 785 of the method 700 are expressed by the following algorithm:

if ((Mod_type$_4$≠Mod_type$_3$) &
   (Mod_type$_4$≠Mod_type$_2$) &
   (Mod_type$_4$≠Mod_type$_1$))

then (Mod_type$_4$=Mod_type$_1$)

where Mod_type$_4$=the modulation format estimation for the fourth burst.

At step 790, the method determines if there are more data blocks in the received signal to be processed. If so, the method continues at step 710 where a next data block in the received signal is set as a current data block to be processed. If not, the method ends.

In some embodiments, the predetermined confidence metrics ($\lambda_1$ and $\lambda_2$) are determined through experimentation to find the confidence metric values that produce the best detection accuracy for the method 700. In some embodiments, the predetermined confidence metrics ($\lambda_1$ and $\lambda_2$) are equal in value. In other embodiments, the predetermined confidence metrics ($\lambda_1$ and $\lambda_2$) are not equal in value. In some embodiments, the predetermined confidence metrics ($\lambda_1$ and $\lambda_2$) range in value from 0 through 4 watts.

A modulation detection of a burst having a low delta NE indicates a low confidence in the detection since this indicates that the burst is not clearly an 8PSK burst or a GMSK burst. As such, if the delta NE of the previous burst is significantly greater than the delta NE of a present burst, this indicates that the confidence of the detection of the previous burst is significantly greater than the confidence of the detection of the present burst so that the method 700 biases the detection of the present burst to equal the detection of the previous burst (if the two detections are not already equal). Conceptually, the value of the predetermined confidence metrics determine what is meant by "significantly greater" and sets the threshold level when the biasing of the method 700 comes into effect. The lower the values of the predetermined confidence metrics, the stronger the biasing effect of the detection method 700.

Figure 8:
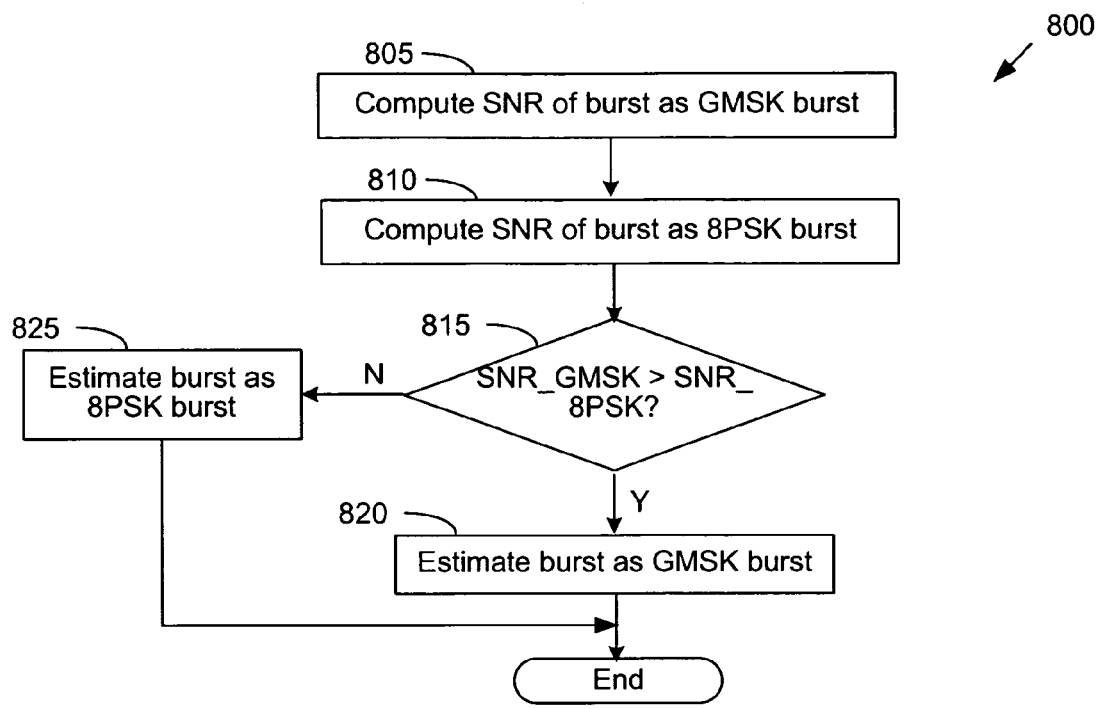
FIG. 8 is a flow chart of a SNR based method for detecting the modulation format type of a burst of a data block.

FIG. 8 is a flow chart of a SNR based method 800 for determining/detecting the modulation format type of a burst of a data block. In some embodiments, the method 800 comprises step 615 of the method 600 (described in relation to FIG. 6) which has received (at step 605) a modulated signal and assigned TSC symbols. In some embodiments, the method 800 also comprises steps 625, 657, and 681 of the method 600.

In general, the method 800 uses the assigned TSC symbols and the TSC symbols of a burst of the received signal to determine the SNR estimates of the burst treated as an 8PSK burst and treated as a GMSK burst. The modulation format type of the burst is then estimated based on a comparison of the SNR estimates of the burst (as an 8PSK and GMSK burst).

The method begins by treating the burst as a GMSK burst and computes (at 805) the SNR of the burst as a GMSK burst (SNR_GMSK). The method may do so, for example, by correlating (multiplying) the TSC symbols of the burst (interpreted as GMSK symbols) with the assigned TSC symbols to generate a TSC symbol product.

The assigned TSC symbols are configured such that, if the TSC symbols of the burst are correctly being interpreted as GMSK symbols (i.e., the burst is in fact a GMSK burst), the generated TSC symbol product should have a high correlation value (peak) in the middle of the TSC symbol product with smaller values (close to zero) at the left and right ends of the TSC symbol product. On the other hand, if the TSC symbols of the burst are incorrectly being interpreted as GMSK symbols (i.e., the burst is not in fact a GMSK burst), the generated TSC symbol product will not have a clear correlation peak in the middle of the TSC symbol product.

The correlation peak in the middle of the TSC symbol product can then be used to determine the channel energy (signal strength) and the noise energy of the burst. This is done by estimating channel taps based on the correlation peaks where the summation of the channel tap magnitudes gives us the total channel energy. If $\vec{h}_i$ is the estimated channel tap width (typically between 4-9 channel taps, each tap being separated by a particular symbol duration depending on the channel model of the system design), the channel energy is equal to:

$$\sum_{i=0}^{L-1} \vec{h}_i.$$

The received signal is reconstructed with the estimated channel taps and the assigned TSC symbols and an estimated error energy (i.e., the error energy of the reconstructed signal in comparison to the actual received signal in the TSC region) is determined. The noise energy of the burst can then be estimated over the TSC symbols by taking the mean square of this estimation error. Thus the noise energy is of the burst is equal to:

$$\left(\frac{1}{N-J+1}\right) \sum_{j=L-1}^{N} \left(y_j - \sum_{i=0}^{L-1} \vec{h}_i * x_{j-i}\right)^2$$

where:
   $x_i$=an assigned TSC symbol;
   $y_i$=a TSC symbol of the burst;
   N=the length of the TSC (e.g., which is 26 symbols long for GSM and EDGE); and
   J=the number of channel taps in the channel estimate.

The SNR of the burst (treated as a GMSK burst) can then be calculated from the channel energy and the noise energy as expressed by the following equation: SNR=channel energy/noise energy.

The method 800 then computes (at 810) the SNR of the burst as an 8PSK burst (SNR_8PSK). The method may do so by repeating the steps described above in relation to step 805, except the method treats the burst as an 8PSK burst. The method then determines (at 815) if the SNR estimate of the burst treated as a GMSK burst is greater than the SNR estimate of the burst treated as an 8PSK burst. If so, the method 800 determines/estimates (at 820) that the burst is modulated as a GMSK burst (since the higher SNR value of the burst as a GMSK burst indicates that the burst is likely a GMSK burst). If not, the method 800 determines/estimates (at 825) that the burst is modulated as an 8PSK burst (since the higher SNR value of the burst as an 8PSK burst indicates that the burst is likely an 8PSK burst). The method then ends.

Figure 9:
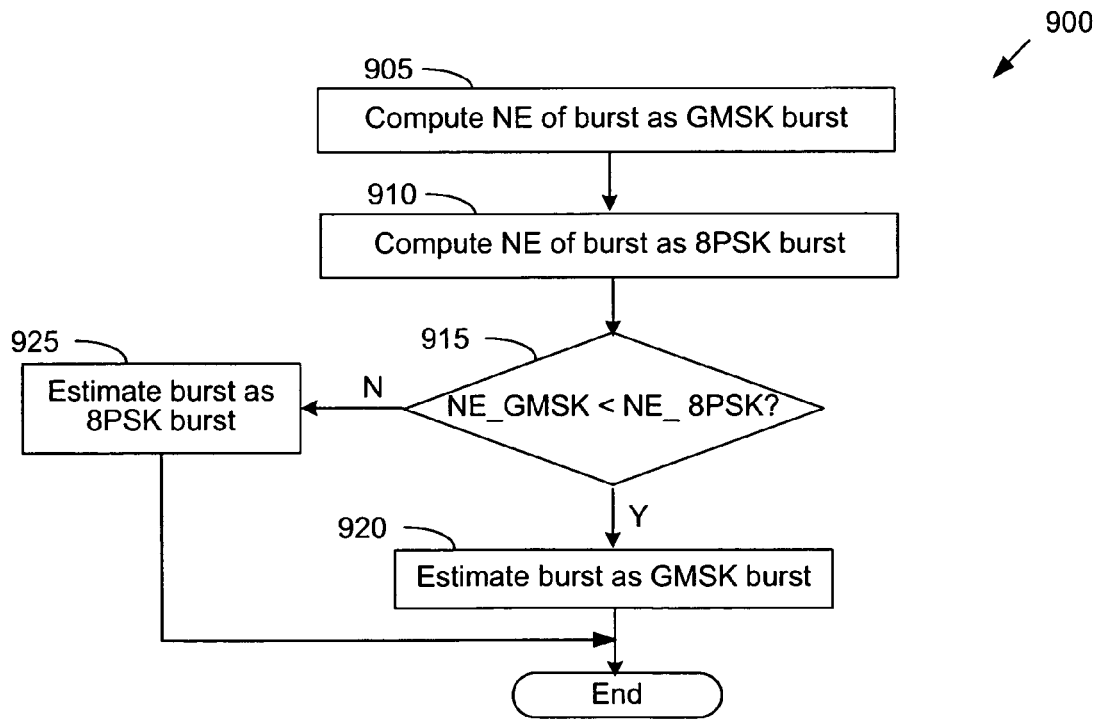
FIG. 9 is a flow chart of a noise-energy based method for detecting the modulation format type of a burst of a data block.

FIG. 9 is a flow chart of a noise-energy based method 900 for determining/detecting the modulation format type of a burst of a data block. In some embodiments, the method 900 comprises step 715 of the method 700 (described in relation to FIG. 7) which has received (at step 705) a modulated signal and assigned TSC symbols. In some embodiments, the method 900 also comprises steps 725, 757, and 781 of the method 700. The method 900 comprises steps that are similar to steps of the method 800 of FIG. 8 (except that the noise energy values of a burst are used instead of the SNR values of the burst) and are not discussed in detail here.

The method begins by treating the burst as a GMSK burst and computes (at 905) the noise energy of the burst as a GMSK burst (NE_GMSK). The method may do so, for example, by correlating the TSC symbols of the burst (interpreted as GMSK symbols) with the assigned TSC symbols to generate a TSC symbol product. The correlation peak of the TSC symbol product is then used to determine the noise energy of the burst (as discussed above).

The method 900 then computes (at 910) the noise energy of the burst as an 8PSK burst (NE_8PSK). The method may do so by repeating the steps described above in relation to step 905, except the method treats the burst as an 8PSK burst. The method then determines (at 915) if the noise energy estimate of the burst treated as a GMSK burst is lower than the noise energy estimate of the burst treated as an 8PSK burst. If so, the method 900 determines/estimates (at 920) that the burst is modulated as a GMSK burst (since the lower noise energy value of the burst as a GMSK burst indicates that the burst is likely a GMSK burst). If not, the method 900 determines/estimates (at 925) that the burst is modulated as an 8PSK burst (since the lower noise energy value of the burst as an 8PSK burst indicates that the burst is likely an 8PSK burst). The method then ends.

Section IV: Test Results for Improved Detection Methods

Figure 10:
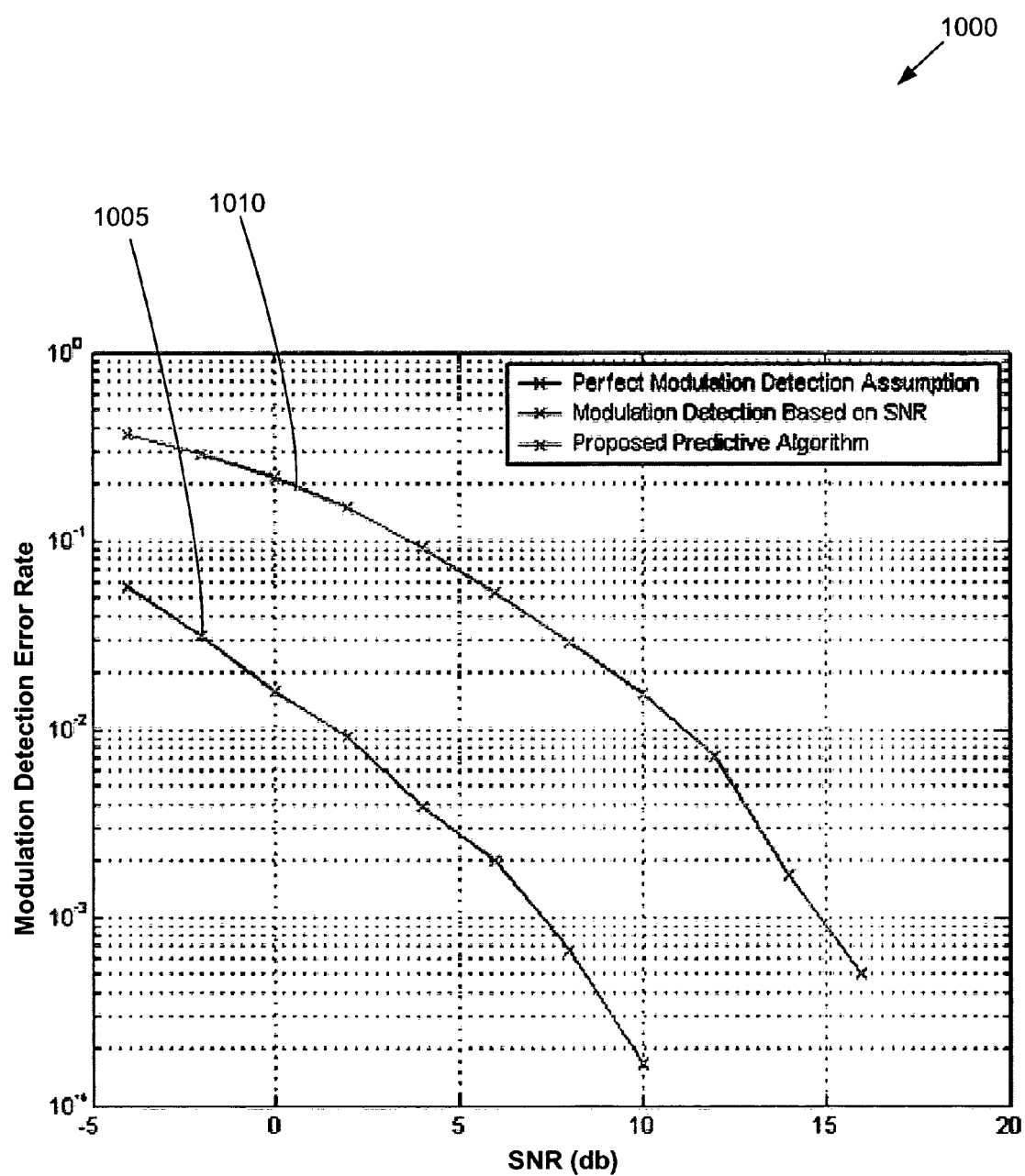
FIG. 10 shows a graph comparing misdetection rates of the conventional and biasing modulation detection methods in detecting a GMSK modulated signal.

FIG. 10 shows a graph 1000 comparing misdetection rates of the conventional and biasing modulation detection methods in detecting a GMSK modulated signal under TU50 channel conditions at the 1900 MHz band. The graph 1000 contains a first segmented line 1005 that illustrates the detection block error rate of the biasing detection method as a function of the SNR of the GMSK signal. The graph 1000 also contains a second segmented line 1010 that illustrates the detection block error rate of the conventional detection method as a function of the SNR of the GMSK signal.

Figure 11:
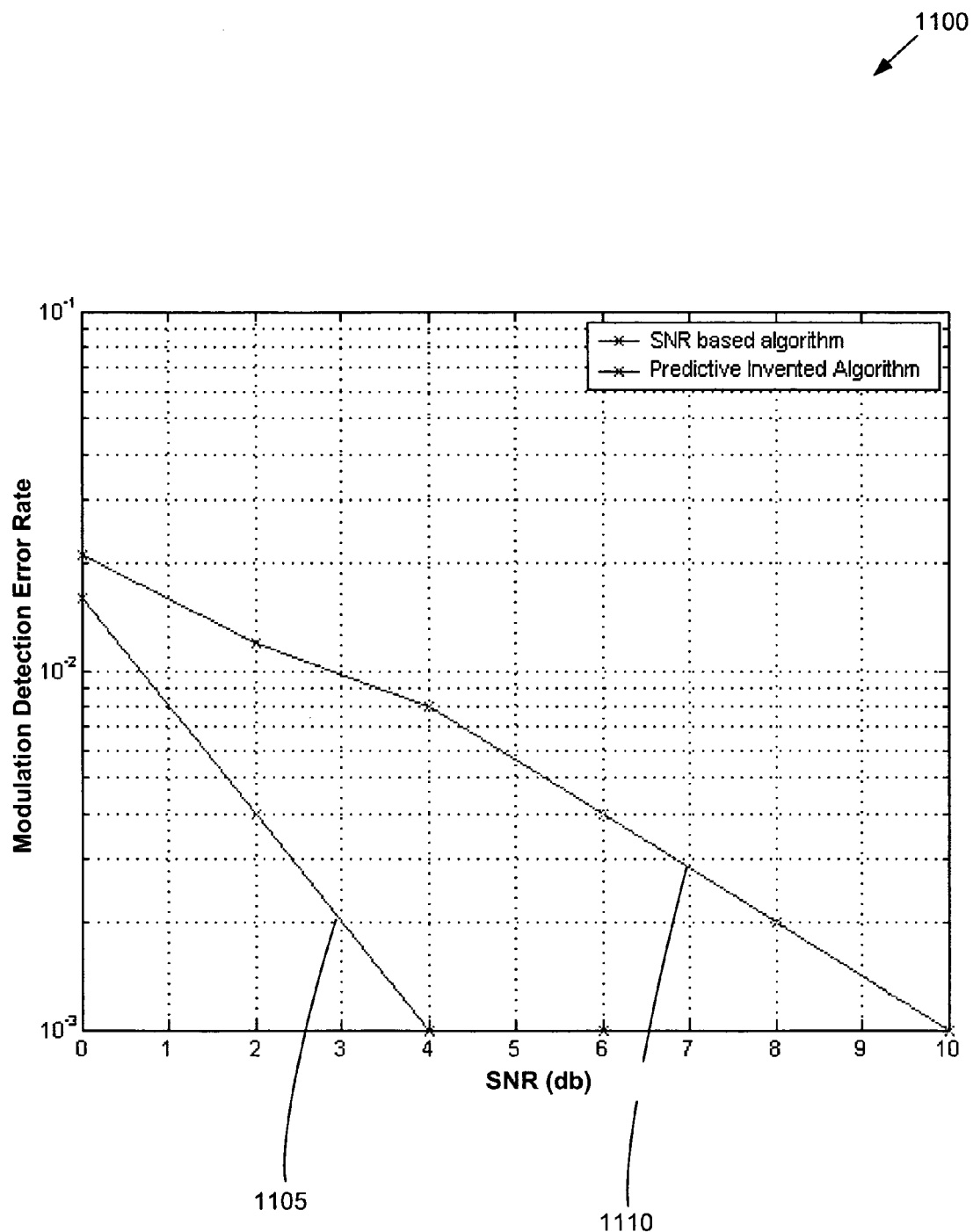
FIG. 11 shows a graph comparing misdetection rates of the conventional and biasing modulation detection methods in detecting an 8PSK modulated signal.

FIG. 11 shows a graph 1100 comparing misdetection rates of the conventional and biasing modulation detection methods in detecting an 8PSK modulated signal under TU50 channel conditions at the 1900 MHz band. The graph 1100 contains a first segmented line 1105 that illustrates the detection block error rate of the biasing detection method as a function of the SNR of the 8PSK signal. The graph 1100 also contains a second segmented line 1110 that illustrates the detection block error rate of the conventional detection method as a function of the SNR of the 8PSK signal.

FIGS. 10 and 11 show that there is approximately a 3-5 db improvement in the biasing modulation detection method over the conventional modulation detection method for both the GMSK and the 8PSK cases (i.e., the biasing detection method performs modulation detection at a signal level that is 3-5 db less than the conventional detection method with same detection error rate).

Figure 12:
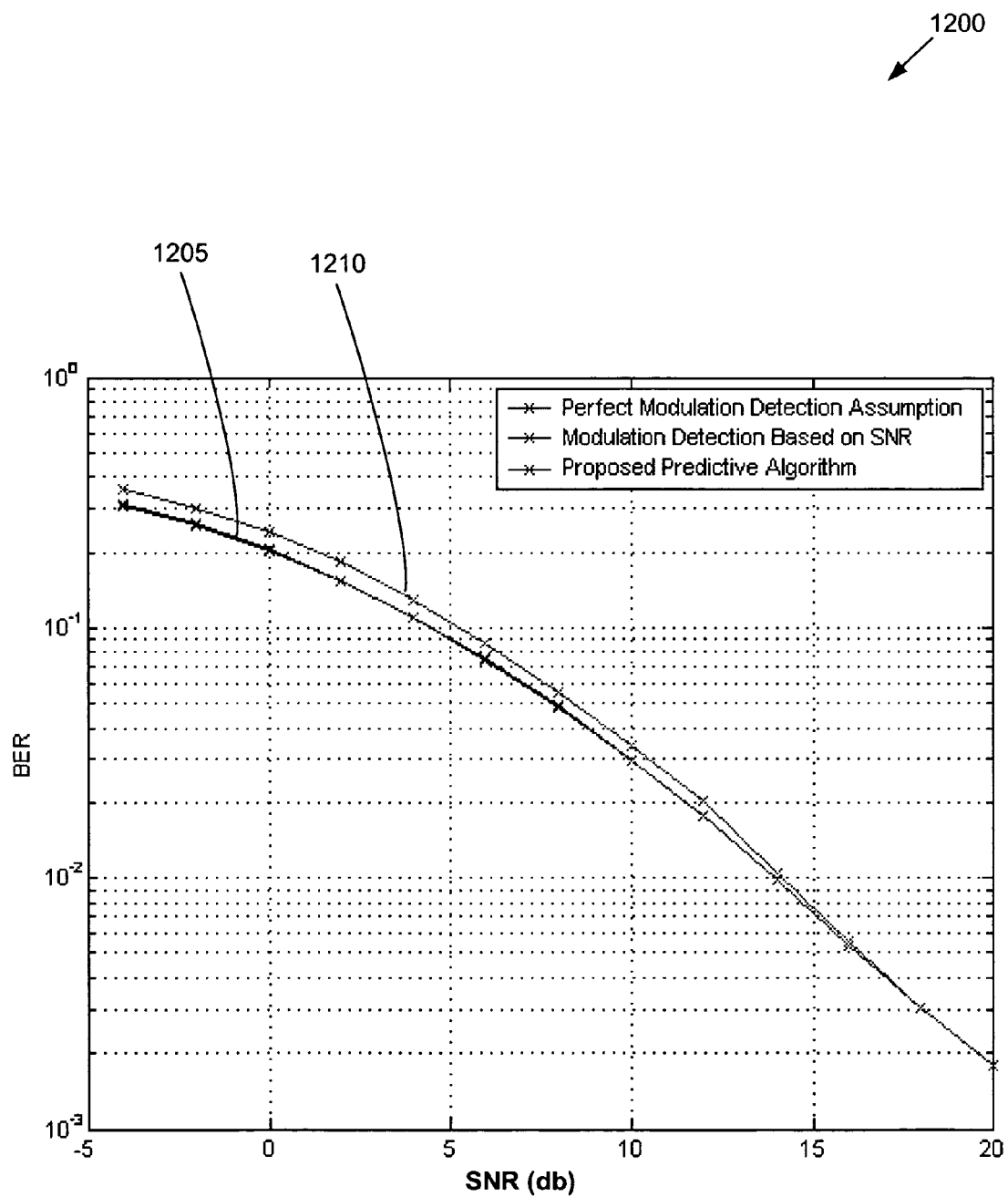
FIG. 12 shows a graph comparing the over all bit error rate (BER) performance of the conventional and biasing modulation detection methods in detecting a GMSK modulated signal.

FIG. 12 shows a graph 1200 comparing the over all bit error rate (BER) performance of the conventional and biasing modulation detection methods in detecting a GMSK modulated signal under TU50 channel conditions at the 1900 MHz band. The graph 1200 contains a first segmented line 1205 that illustrates the detection bit error rate of the biasing detection method as a function of the SNR of the GMSK signal. The graph 1200 also contains a second segmented line 1210 that illustrates the detection bit error rate of the conventional detection method as a function of the SNR of the GMSK signal. FIG. 12 shows that the bit error rate of the biasing detection method is improved by 0.25-0.5 db at the 10% BER point over the conventional detection method. This improved detection performance results in an improvement in the block error rate (BLER) as well.

As shown in FIGS. 10, 11, and 12, test results show that there is an improvement in modulation detection accuracy of the biasing detection method over the conventional detection method.

Figure 13:
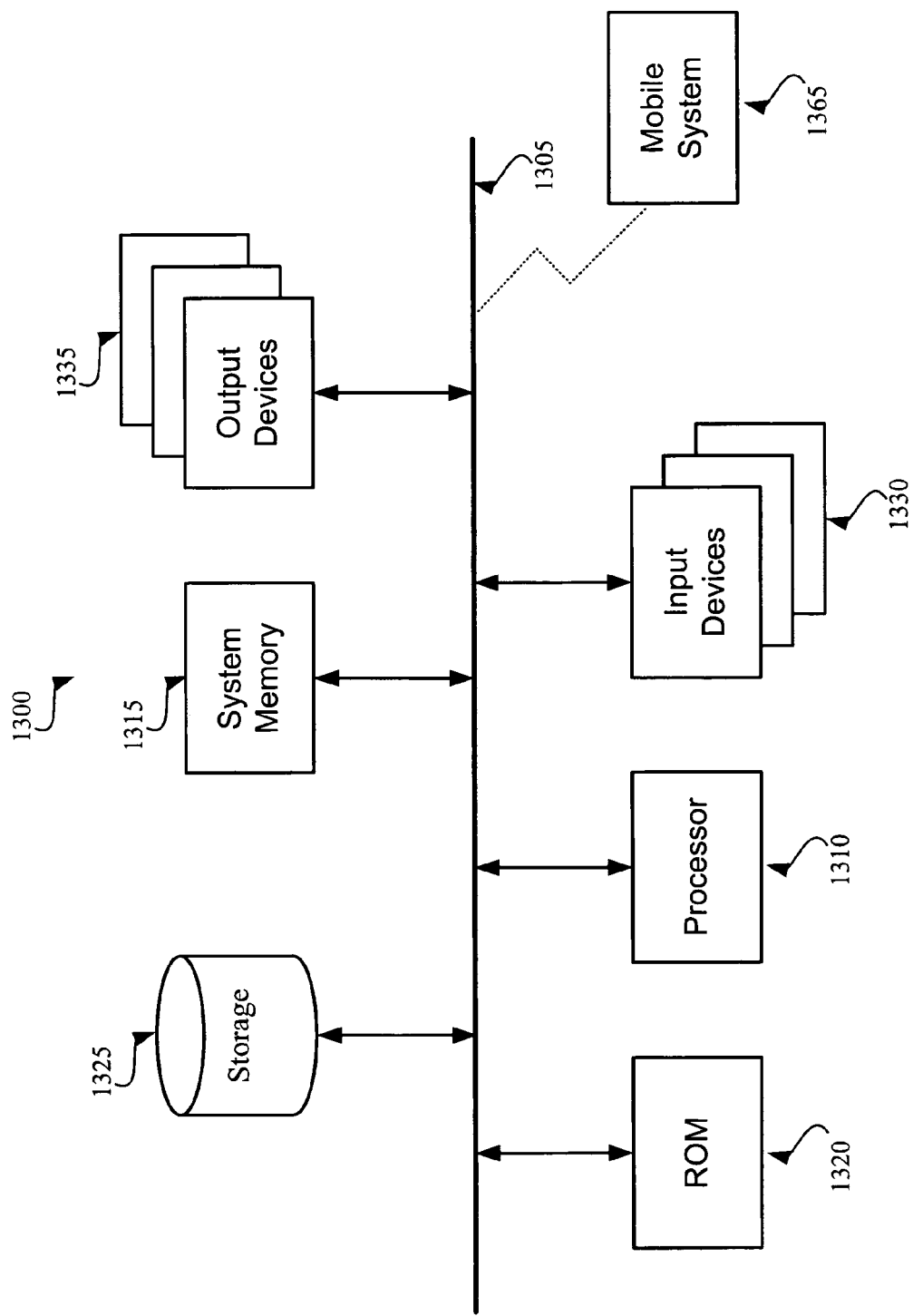
FIG. 13 presents a computer system with which some embodiments are implemented.

FIG. 13 presents a computer system 1300 with which some embodiments are implemented. In some embodiments, the computer system 1300 comprises a receiving device (mobile terminal). The computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325.

The read-only-memory (ROM) 1320 stores static data and instructions that are needed by the processor 1310 and other modules of the computer system. The permanent storage device 1325, on the other hand, is read-and-write memory device. This device is a non-volatile memory unit that stores instruction and data even when the computer system 1300 is off. Some embodiments use a mass-storage device (such as a magnetic or optical disk and its corresponding disk drive) as the permanent storage device 1325. Other embodiments use a removable storage device (such as a floppy disk or zip® disk, and its corresponding disk drive) as the permanent storage device.

Like the permanent storage device 1325, the system memory 1315 is a read-and-write memory device. However, unlike storage device 1325, the system memory is a volatile read-and-write memory, such as a random access memory (RAM). The system memory stores some of the instructions and data that the processor needs at runtime.

Instructions and/or data needed to perform methods of some embodiments are stored in the system memory 1315, the permanent storage device 1325, the read-only memory 1320, or any combination of the three, all of which may comprise a computer program product. For example, the various memory units may contain instructions for detecting the modulation format type of a received signal in accordance with some embodiments. From these various memory units, the processor 1310 retrieves instructions to execute and data to process in order to execute the processes of some embodiments.

The bus 1305 also connects to the input and output devices 1330 and 1335. The input devices 1330 enable a user to communicate information and select commands to the computer system 1300. The input devices 1330 include alphanumeric keyboards and cursor-controllers. The output devices 1335 display images generated by the computer system 1300. The output devices include printers and display devices, such as cathode ray tubes (CRT) or liquid crystal displays (LCD).

Finally, as shown in FIG. 13, the bus 1305 also remotely connects (through a form of wireless transmission) the computer system 1300 to a mobile system 1365 through, for example, a receiver (not shown). In this manner, the computer system 1300 can be a part of the mobile system 1365. Any or all of the components of the computer system 1300 may be used in conjunction with some embodiments. However, one of ordinary skill in the art would appreciate that any other system configuration may also be used in conjunction with other embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or method described in connection with the embodiments disclosed herein may be embodied directly in hardware (i.e., hardwired), in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile terminal. In the alternative, the processor and the storage medium may reside as discrete components in a mobile terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A computer program product comprising a computer readable medium having instructions stored thereon when executed to estimate a modulation format of a signal being modulated, the signal comprising a plurality of blocks, each block comprising a plurality of bursts, the computer program product comprising sets of instructions for:

a) determining a first modulation format estimation of a first burst of a block; and b) determining a second modulation format estimation of a second burst of the block using information relating to the first modulation format estimation;

said determinings comprises:

determining a first delta signal-to-noise ratio (SNR) comprising the difference in SNRs of the first burst modulated in the first modulation format and the first burst modulated in the second format;

determining a second delta SNR comprising the difference in SNRs of the second burst modulated in the first modulation format and the second burst modulated in the second modulation format;

determining that the difference in the first and second delta SNRs is greater than a predetermined confidence metric;

determining that the second modulation format estimation is not equal to the first modulation format estimation; and resetting the second modulation format estimation to equal the first modulation format estimation.

2. The computer program product of claim 1 wherein the predetermined confidence metric ranges in value from 0 through 4 decibels.

3. A computer program product comprising a computer readable medium having instructions stored thereon when executed estimate a modulation format of a signal being modulated in one of at least two possible modulation formats, the signal comprising a plurality of blocks, each block comprising a plurality of bursts, the computer program comprising sets of instructions for:

a) determining a first modulation format estimation of a first burst of a block; and b) determining a second modulation format estimation of a second burst of the block using information relating to the first modulation format estimation.;

wherein the information relating to the first modulation format estimation comprises the result of the first modulation format estimation, signal-to-noise ratio (SNR) information of the first burst, or noise energy information of the first burst;

and wherein the set of instructions for determining the second modulation format estimation comprises sets of instructions for:

determining a first delta noise energy (NE) comprising the difference in NEs of the first burst modulated in the first modulation format and first burst modulated in the second modulation format;

determining a second delta NE comprising the difference in NEs of the second burst modulated in the first modulation format and second burst modulated in the second modulation format;

determining that the difference in the first and the second delta NEs is greater than a predetermined confidence metric;

determining that the second modulation format estimation is not equal to the first modulation format estimation; and resetting the second modulation format estimation to equal the first modulation format estimation.

4. The computer program product of claim 3 wherein the predetermined confidence metric ranges in value from 0 through 4 watts.

\* \* \* \* \*